E. E. UNDERWOOD & F. H. REYNOLDS.
PHOTOGRAPHIC CAMERA.
APPLICATION FILED SEPT. 23, 1915.
1,218,135.
Patented Mar. 6, 1917.
2 SHEETS—SHEET 1.
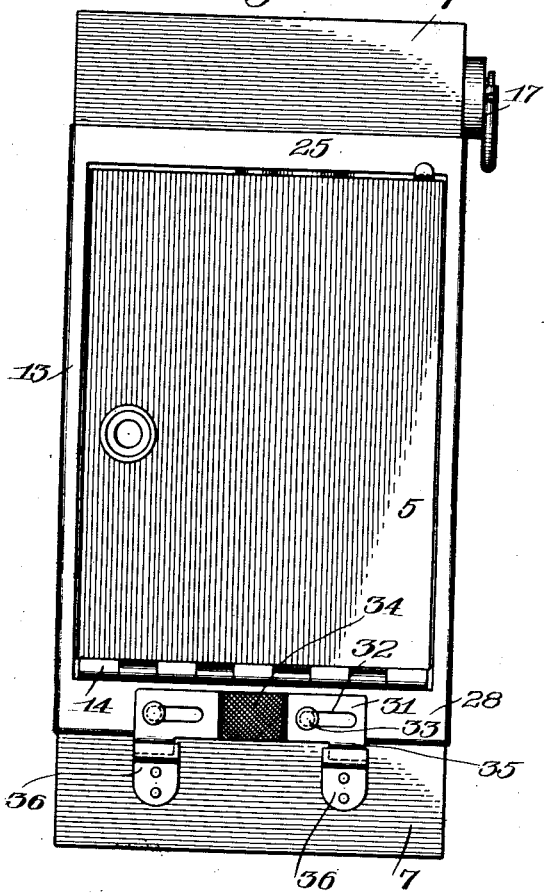
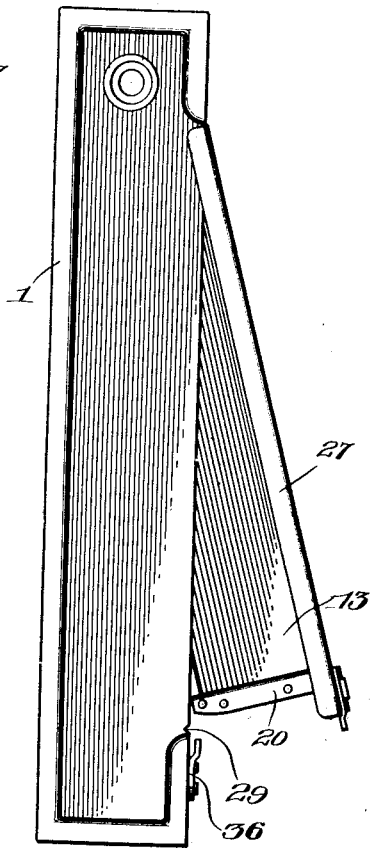
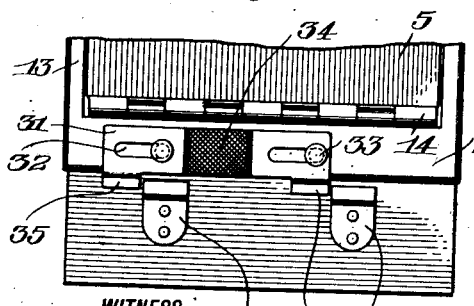
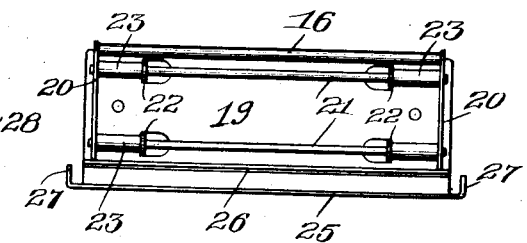
WITNESS
Walter B. Payne
INVENTORS
Ernest E. Underwood
Frank H. Reynolds
BY
his ATTORNEYS E. E. UNDERWOOD & F. H. REYNOLDS.
PHOTOGRAPHIC CAMERA.
APPLICATION FILED SEPT. 23, 1915.
1,218,135.
Patented Mar. 6, 1917.
2 SHEETS—SHEET 2.
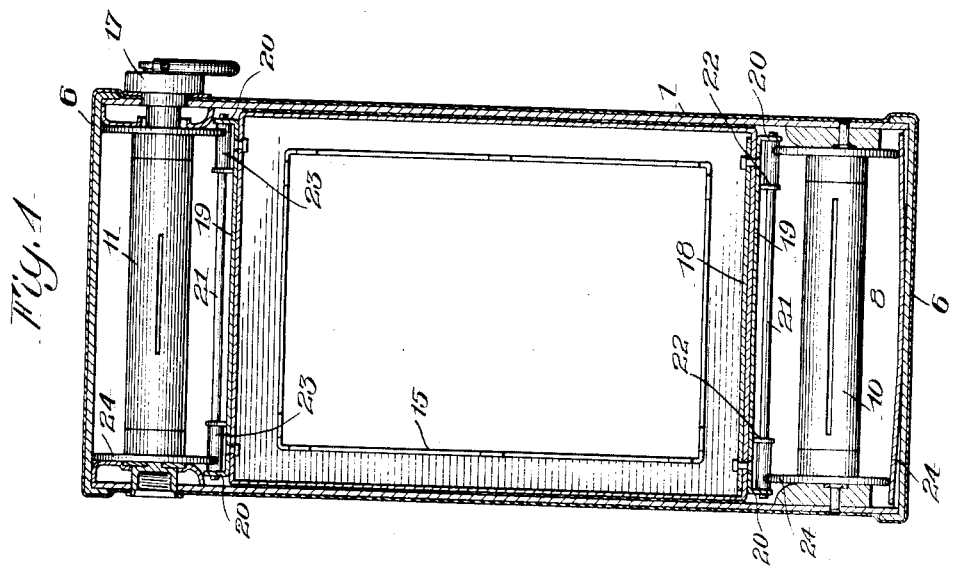
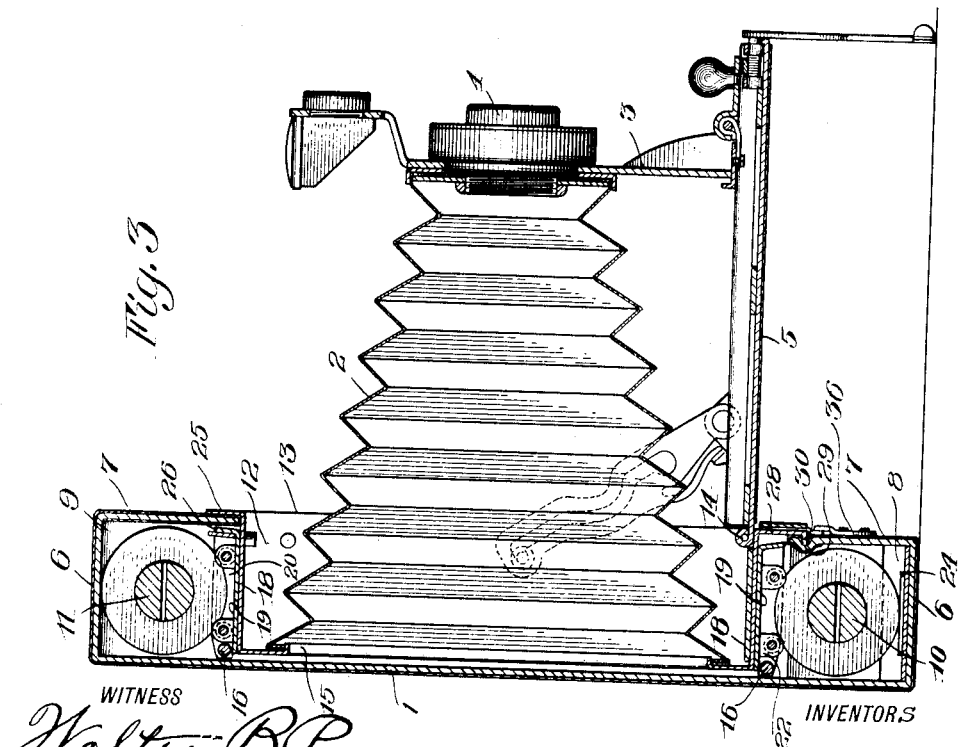
WITNESS
Walter B. Payne
INVENTORS
Ernest E. Underwood
Frank H. Reynolds
his ATTORNEYS

UNITED STATES PATENT OFFICE.

ERNEST E. UNDERWOOD AND FRANK H. REYNOLDS, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC CAMERA.

1,218,135.     Specification of Letters Patent.     Patented Mar. 6, 1917.

Application filed September 23, 1915. Serial No. 52,161.

*To all whom it may concern:*

Be it known that we, ERNEST E. UNDERWOOD and FRANK H. REYNOLDS, of Rochester, in the county of Monroe and State of New York, have invented certain new and useful Improvements in Photographic Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras of the pocket or folding type and it has for its object to provide an improved camera of this kind that will be strong and durable but relatively simple and easy to manufacture, the number of major parts being reduced. The improvements relate in part to the manner in which the film chambers of a roll holding camera are formed and the means whereby they are made accessible for the insertion and removal of the film. A further object of the invention is to simplify the assembling of the camera. To these and other ends the invention resides in certain improvements and combinations of parts all as will be hereinafter more fully described, the novel features being pointed out in the claims at the end of the specification.

In the drawings:

Figure 1 is a front elevation of a camera constructed in accordance with and illustrating one embodiment of our invention, the said camera being in a folded condition;

Fig. 2 is a side elevation illustrative of the manner of opening the camera to gain access to the film chamber;

Fig. 3 is a longitudinal section through the camera in extended position taken substantially in the vertical plane of the axis of the lens;

Fig. 4 is a transverse section taken substantially in the plane of the axes of the film spools;

Fig. 5 is a fragmentary view similar to Fig. 1 but showing a different position of the catch for holding the camera closed, and Fig. 6 is a detail view of one of the cradles in which the film spools rest.

Similar reference numerals throughout the several figures indicate the same parts.

Referring more particularly to the drawings, 1 indicates the camera body; 2 the bellows; 3 the front carrying the lens tube 4, and 5 the cover that closes the front of the body but, when extended, acts as a bed as shown in Fig. 3. The body 1 is not open at the rear at all nor provided with the usual removable back but on the other hand, the back wall thereof is continuous and is extended forwardly at each end at 6 and thence inwardly at the front at 7 to form the rear end and front walls of the film chambers 8 and 9 for the supply spool 10 and the winding spool 11, respectively.

Intermediate the film chambers 8 and 9 is the usual bellows chamber 12 into which the bellows 2 and front 3 are folded when the camera is closed. This bellows chamber is comprised within a removable and replaceable frame 13 that has the door or bed 5 hinged to it at 14 and around an exposure opening 15 in the rear of which the rear end of the bellows 2 is secured. Thus, the bed 5, the front and the bellows all come away from the camera with it when this frame 13 is removed. It further carries the guide rolls 16 of the usual kind over which the film is fed past the exposure opening 15 from the spool 10 in the chamber 8 to the spool 11 in the chamber 9. A winding key 17 of the usual or any preferred construction and mounted in a wall of the body 1 detachably coöperates with the winding spool 11 to reel up the film in the ordinary manner.

The top and bottom walls 18 of the frame 13 constitute the inner walls of the film chambers 8 and 9 and they carry cradles in which the spools are revolubly held. These cradles may comprise plates 19 (Fig. 6) secured to the said walls 18 and having flanges 20 in which are journaled parallel shafts 21. On each shaft between the flanges 20 and ears 22 struck up from the plate are confined anti-friction rollers 23 positioned to contact with the flanges 24 of the spools, as clearly shown in Figs. 3 and 4. These rollers take the thrust of the spool in each instance resulting from the winding operation, while the other walls of the film chambers prevent the spools from riding out of their cradles. The cradles may also carry the guide rollers 16 before mentioned. A spring 24 arranged in the feed roll chamber 8 is placed under tension when the feed spool 10 is in place and frictionally engages the flanges 24 thereof to prevent the feed from being too free and this spring also prevents the spool from chattering.

It is apparent that when the frame 13 is removed only the mere shell of the body 1 is left and both film rolls become accessible. Their inner walls have been taken away with the frame and the other parts and the spools may be rolled out from beneath the front walls 7 of the chambers or rolled into position beneath them, as the case may be. This makes it very easy to load the camera in the first instance as the supply spool 10 need be unrolled only a very little to thread its outer end or, rather, the outer end of the film roll thereon, into the take-up spool 11 while both spools are held in the hand out of the camera. The supply spool is then inserted in its chamber and unwound as the winding spool is drawn across to place it in the chamber 9 and at the same time spread the film or the lead of paper therefrom in the focal plane of the camera. As soon as both spools are in position, the frame 13 is inserted confining them there and upon engaging the winding sheet 17, the film is fed out and drawn taut and the camera is ready for an exposure.

Of course, the frame 13 must have a light tight connection with the body or shell 1 and we prefer to attach it in the following manner:

At the top front edge of the frame an outer lip 25 and an inner lip 26 are formed, the latter, if desired, being part of the adjacent cradle plate 19, as shown. These lips form a slip connection with the front wall 7 of the film chamber 9 by straddling the inner edge thereof, which connection is light tight, while to prevent the entrance of light down the sides, the front side edges of the frame 13 are provided with rearwardly turned flanges 27 that engage over the front edge of the body wall. At the bottom of the frame a lip 28 overlaps the front wall 7 of the film chamber 8 which wall has a groove or depression 29. This groove forms a seat receiving a rearwardly turned flange 30 on the lip 28 resulting in a light tight joint at this point also.

As the lips 25 and 26 at the top may be slipped into engagement by introducing the frame 13 at the angle shown in Fig. 2, a positive lock is needed only at the bottom. We prefer to use a lock of the form shown in Figs. 1, 2 and 5, comprising a sliding bolt plate 31 slotted at 32 and mounted upon headed guide pins 33 on the lip 28 of the front flange. An intermediate roughened finger portion 34 enables the operator to slide the bolt back and forth so that locking tongues 35 thereon are moved into and out of engagement with offset keeper plates 36 secured on the outer face of the front wall 7 of one of the film chambers. The engaged position is shown in Fig. 1 and the disengaged position in Fig. 5.

The camera of our invention is light, simple and compact and as practically all of the major parts that require the most work in assembling are mounted on or in connection with the frame 13, most of the assembling can be done with an attendant handling of the frame 13 only and danger of marring the exterior finish of the body is not involved. The further advantages of manipulating the film spool have been previously explained.

We claim as our invention:

1. In a camera, the combination with a body having film chambers at both ends, the back, end and front walls of which are relatively fixed, and a bellows and front, of a removable and replaceable intermediate element constituting the bellows chamber and forming the inner walls of the film chambers so that the latter are made accessible for the insertion of film by removing the said element in a forward direction.

2. In a camera, the combination with a body having film chambers at both ends including front, rear, outer and end walls, and a bellows and front, of a removable and replaceable intermediate element constituting the bellows chamber and forming the inner walls of the film chamber, and means on said last mentioned walls for rotatably supporting film spools by contact with their peripheral surfaces.

3. In a camera, the combination with a body having film chambers at both ends, the back, end and front walls of which are relatively fixed, and a bellows and front, of a removable and replaceable intermediate element constituting the bellows chamber and forming the inner walls of the film chambers so that the latter are made accessible for the insertion of film by removing the said element, and cradles for the film spools on the said inner walls of the film chambers embodying parallel rollers arranged to engage the flanges of the spools.

4. In a camera, the combination with a body having film chambers at its ends each of which is formed rigidly in fixed relation to the back of the body by continuing the back wall of the latter forwardly and then inwardly, and a bellows and front, of a removable and replaceable intermediate frame carrying the bellows and front and constituting the bellows chamber and also the inner walls of the film chambers and having interlocking light-tight connections at its opposite ends with the inwardly turned front walls of the bellows chamber.

5. In a camera, the combination with a body having film chambers at its ends each of which is formed rigidly in fixed relation to the back of the body by continuing the back wall of the latter forwardly and then rearwardly, and a bellows and front, of a removable and replaceable intermediate frame constituting the bellows chamber and also the inner walls of the film chambers, one end of the frame being provided with a double lip adapted to be thrust over the edge of the front wall of one film chamber and the opposite end of the frame being arranged to overlap the corresponding edge of the front wall of the other film chamber, and a catch for securing said last mentioned overlapping end in place.

ERNEST E. UNDERWOOD.
    FRANK H. REYNOLDS.

Witnesses:
 EDITH WATERSTRAAT,
 M. JOSEPH SULLIVAN.